United States Patent
Larsson et al.

(10) Patent No.: US 7,323,216 B2
(45) Date of Patent: Jan. 29, 2008

(54) METHOD AND AN ARRANGEMENT FOR PREPARATION OF OPTICAL FIBERS

(75) Inventors: Magnus Larsson, Bromma (SE); Jan-Åke Engstrand, Trångsund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 806 days.

(21) Appl. No.: 10/470,933

(22) PCT Filed: Jan. 17, 2002

(86) PCT No.: PCT/SE02/00081

§ 371 (c)(1),
(2), (4) Date: Jan. 27, 2004

(87) PCT Pub. No.: WO02/062718

PCT Pub. Date: Aug. 15, 2002

(65) Prior Publication Data

US 2004/0109941 A1    Jun. 10, 2004

(30) Foreign Application Priority Data

Feb. 6, 2001    (SE) .................................. 0100366

(51) Int. Cl.
*B05D 5/06* (2006.01)

(52) U.S. Cl. ................ 427/162; 427/430.1; 427/8; 118/669

(58) Field of Classification Search ............... 427/162, 427/8, 430.1; 118/669
See application file for complete search history.

(56) References Cited

U.S. PATENT DOCUMENTS

| 2,247,132 | A | * | 6/1941 | Przyborowski | ........ 29/890.054 |
| 5,271,902 | A | * | 12/1993 | Sakka et al. | ................ 422/100 |
| 5,636,020 | A | * | 6/1997 | Csipkes et al. | ............ 356/505 |
| 2003/0020500 | A1 | * | 1/2003 | Altmann et al. | ............ 324/750 |

\* cited by examiner

*Primary Examiner*—Alain L. Bashore

(57) ABSTRACT

The invention relates to a method and an arrangement for applying a coating on an end of an optical fiber by dipping said end into a unsolidified coating liquid. In a first sequence, the fiber end is moved towards the surface (18) of the liquid by a gripping means (11). The distance between the end face (26) of the fiber and the surface of the liquid is measured continuously by measuring means including a vision camera (23). The measured actual distance value is compared with a preset distance value and the first moving sequence is ended when the actual distance value is equal to the preset value. In a second sequence, the fiber end is dipped a predetermined depth in the liquid.

5 Claims, 3 Drawing Sheets

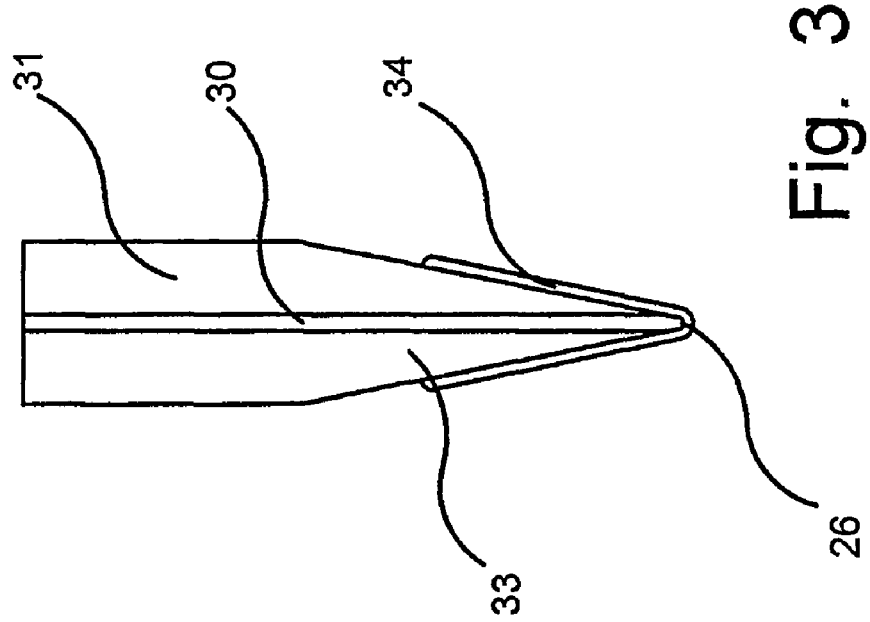
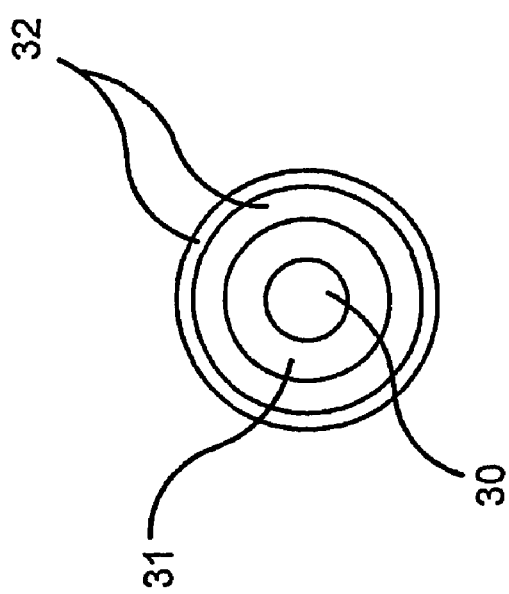

METHOD AND AN ARRANGEMENT FOR PREPARATION OF OPTICAL FIBERS

TECHNICAL FIELD

The invention relates to a method and an arrangement for applying a coating on an end face of an optical fiber by dipping said end face into an unsolidified liquid form of said coating.

BACKGROUND OF THE INVENTION

Optical fiber ends are normally carefully prepared before they are connected to light emitting or light receiving devices. Typical measures are forming tapered fiber core end faces and subsequently applying a metal covering on adjacent parts of the fiber end. In order to keep the tapered end face free from all impurities while the metal covering is applied it is necessary to provide said end face with a protective coating. The coating should preferably be easy to apply and remove and at the same time give a sufficient protection.

According to known methods such coatings are provided by dipping the end face into an unsolidified liquid state of the coating by hand and arranging for setting or drying afterwards. These manual treatments are, however, not effective in microoptoelectronic applications when the dipping of the fiber face end has to be very limited and the liquid quite often is a transparent lacquer with an indistinct surface which is hard to locate for the operator.

SUMMARY OF THE INVENTION

One problem appearing in the known manual method is that it is difficult to control the dipping depth into the liquid. This will cause some fiber ends to be covered too long by the coating, which in turn will make the metal covering too short. The covering, normally a thin layer of gold is applied in order to attain a firm and easy made solder to the connected laser or light receiving device. If the covering is too short the fiber end might start to vibrate and give signal disruptions. On the other hand if it is too long, the light emitting core end might be covered by the metal layer or at least contaminated which will result in no or very distorted transmitted signals. Quite often the fiber ends are also dipped down to the bottom of the rather shallow container that contains the unsolidified coating and the core end might be damaged by the hit against the bottom. In summary, the treatment by hand gives an uneven quality and a too high proportion of fiber ends that have to be rejected. In addition the method is not very cost effective in industrial production.

For the reasons above one of the objects of the present invention is to present a method and an arrangement for applying a coating on an end face of an optical fiber in which an even quality and a cost-effective production can be achieved. Another object is to enable an automated production unit by means of image and data processing.

These and other objects of the present invention are achieved by using a method in which a coating is applied on the end face of an optical fiber by dipping said end face into an unsolidified liquid state of the coating. The method comprises the steps of, moving the fiber end towards a surface of the liquid in a first moving sequence, measuring the distance between the end face and the surface of the liquid, comparing the actual distance value with a preset value, ending the first moving sequence when the actual distance value is equal to the preset value, starting a second moving sequence sinking the fiber end face into the liquid a predetermined depth and finally moving the fiber end face up from the liquid.

The method and arrangement according to the present invention have the following advantages: It is possible to set up a production unit that can produce coatings on the fiber end faces of equal size and quality. The unit can be totally or partly automated. This means in turn that less fiber ends have to be sorted out and disapproved and the overall production costs can be cut. Another advantage is that image processing can be used in spite of the problem of focusing the more or less invisible liquid surface of the unsolidified coating and that the processing means can be set up by a vision and computer system of uncomplicated design. The arrangement as a whole is also quite simple with few moving parts and is easy to monitor and adapt to different fiber ends, tapering and coatings.

BRIEF DESCRIPTION OF THE DRAWING

The invention will be described more in detail with reference to the following drawings, in which:

FIG. 3 shows schematically a side view of a tapered face end of an optical fiber, and FIG. 4 shows schematically a cross section of an optical fiber

DETAILED DESCRIPTION OF THE INVENTION

Figure 1:
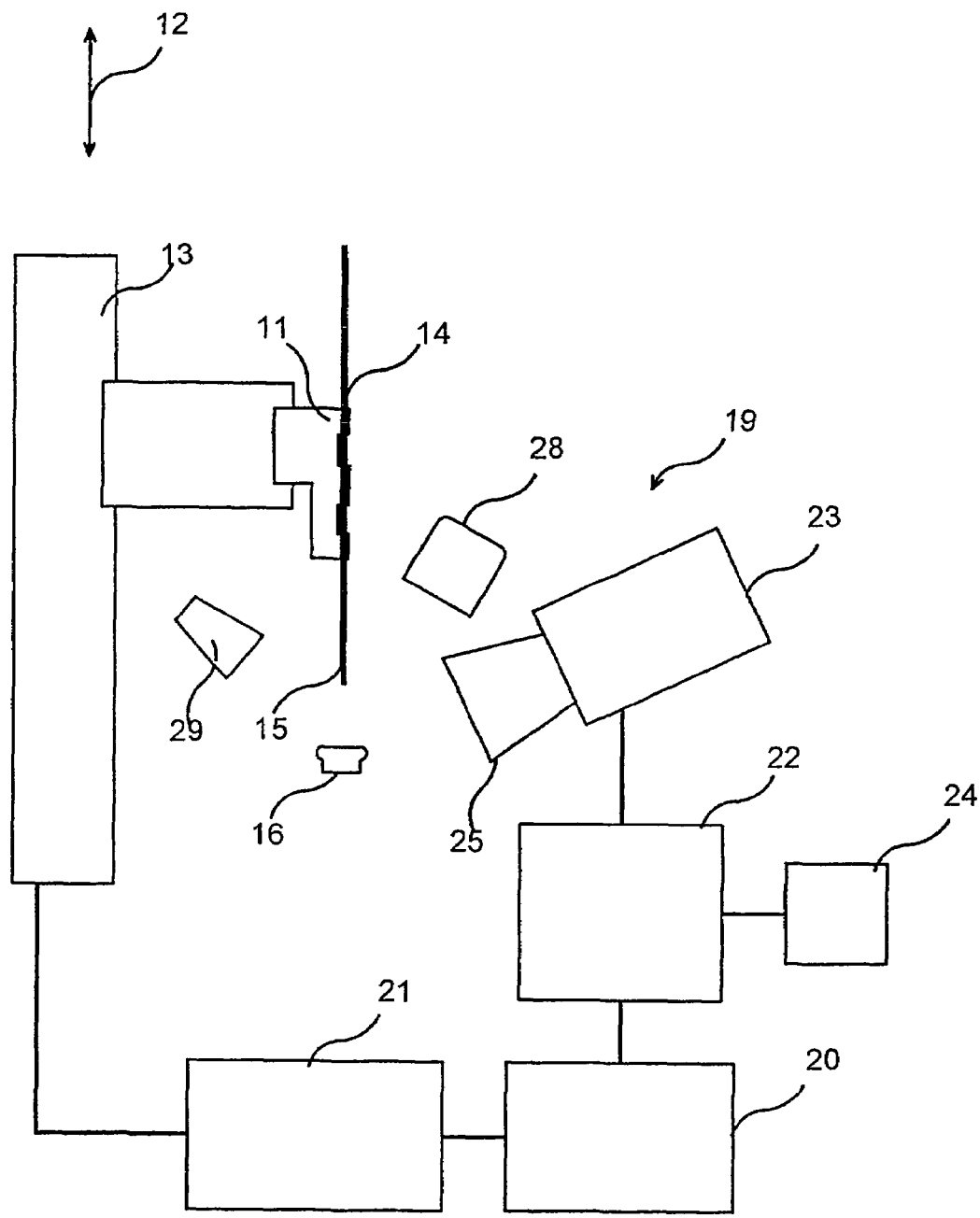
FIG. 1 shows schematically a side view of an arrangement according to the invention.
Figure 2:
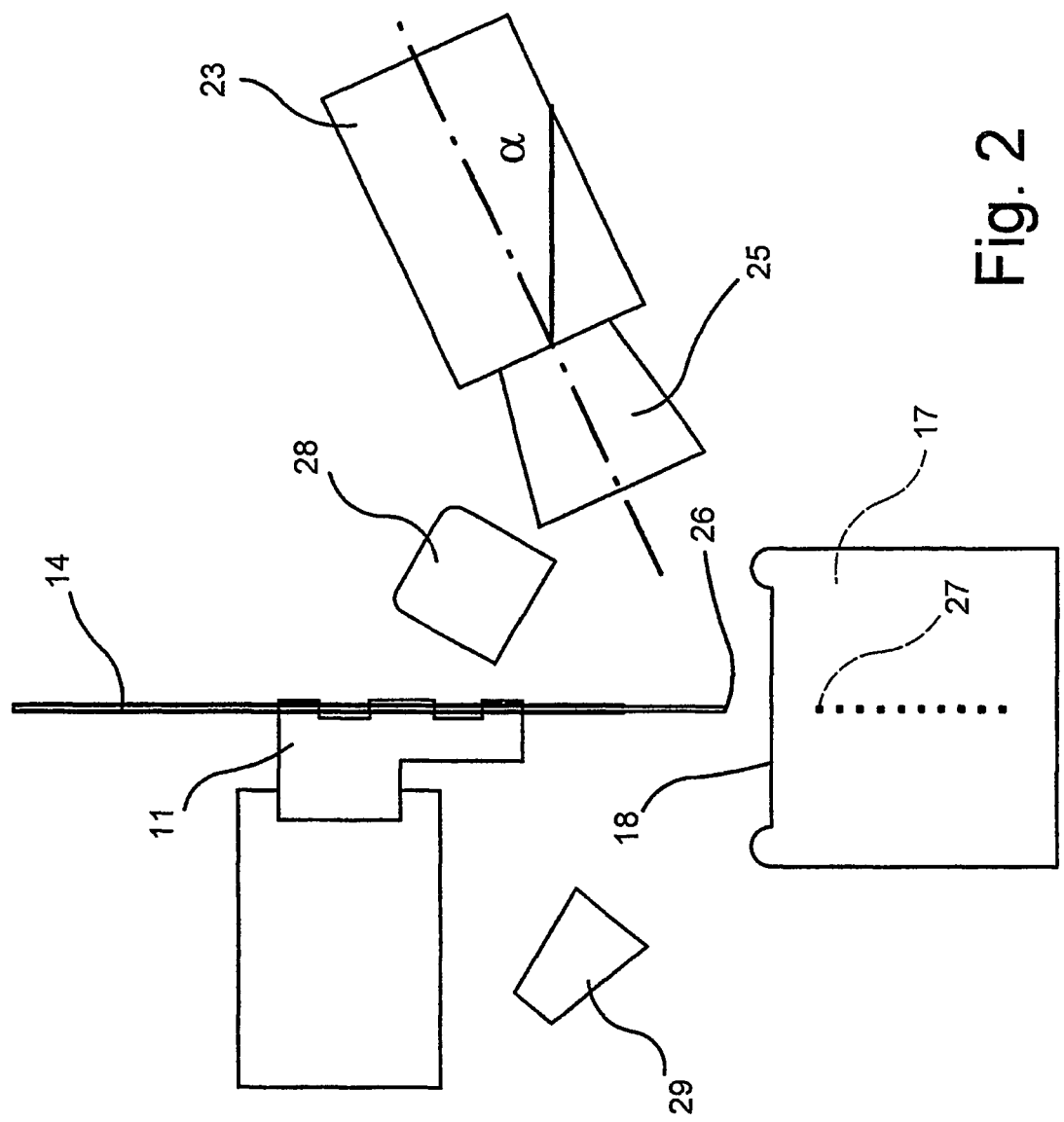
FIG. 2 shows schematically a side view of some details in FIG. 1.

The arrangement according to FIGS. 1 and 2 comprises a gripping means 11 that is moveable in the vertical direction 12 by means of some suitable moving means 13. The gripping means 11 is arranged to grip and hold an optical fiber 14 close to one fiber end 15. A container or reservoir 16 holding a liquid state of a lacquer 17 is located under the gripping means 11 with a free surface 18 of the liquid 17 facing the vertical linear moving track of the gripping means 11. As can be seen from the drawings the fiber end 15 can be moved in its longitudinal direction vertically downwards towards the liquid container 16. The movement is supervised and controlled by a measuring means 19, a processing means 20 and a movement controlling means 21. The measuring means 19 includes an image processing means 22 comprising a known vision system with a camera 23 and calculating means 24.

The image processing means could for example by set up by a CCD-camera (charged coupled device camera) or a C-MOS camera. The camera 23 is arranged to vision the last part of the movement of the fiber end 15 towards the liquid surface 18. Normally said last part is within the range of 1 mm putting high demands on accuracy and firmness on moving details and their control. The camera lens 25 is arranged at an angle of α to the horizontal plane, and the liquid surface 18 enabling the best possible view on both the fiber end face 26 and its mirror projection 27 created by the liquid surface 18. Said angle α should be somewhere between 15-45°, preferable 25-35°. An accurate vision is also supported by a lamp 28 located at a suitable angle above the liquid surface 18. Another lamp 29 for providing ultra violet radiation on the coating after the dip is arranged near to the container 16 but on the other side.

An optical fiber of a kind being particularly suitable for treatment according to the present invention is shown in FIG. 4 in a cross sectional view. The optical fiber 14 comprises a core 30 and a cladding 31 of quartz glass and one or more layers of coating 32 made of acrylate or silicone. The invention is as mentioned before part of an overall method for preparing such fibers to be installed in light emitting laser chips or light receiving devices. Initial and not shown steps are stripping the fiber ends from the coating leaving the core 30 and cladding 31 free and forming the fiber end face 26 by heat treatment into a tapered end 33 as shown in FIG. 3.

The fiber end prepared according to the initial steps above is put in a vertical position by the gripping means according to some known positioning method and the following method of applying a coating on the end face end is initiated:

In the starting position, shown in FIGS. 1 and 2, both the fiber end face 26 and the liquid surface 18 are located within the viewing range of the vision camera 23. In that position, the end face 26 normally is located 0.5-1 mm above the surface. In a first sequence of the further move towards the liquid, the end face 26 is moved to a preset position very close to the surface18 of the liquid. The movement of the gripping means 11 is in all sequences controlled by the controlling means 21, which in turn get input signals from the processing means 20. During the move of the gripping means 11, the measuring means 19 including the image processing means 22, the camera 23 and the calculating means 24 is continuously measuring the distance between the end face and the surface of the liquid. The lens 25 of the camera 23 is focused to vision both the end face 26 and the mirror projection 27 of the end face in the surface of the liquid and the image processing means 22 reads the positions and the calculating means 24 calculates the actual distance values between them. The processing means 20 in turn calculates the difference between the measured values and a preset value corresponding to the preset position close to the surface. When the actual value reaches the preset value the controlling means 21 is signaled to end the first moving sequence.

In this position, the end face is located very close to the surface at an accurately measured distance preferably set to be in the range of 0.10-0.20 mm. After that, a second sequence is started in which the fiber end is dipped into the liquid a predetermined depth and moved back up from the liquid again in a third sequence. It should be noted that said moving sequences are not necessarily distinct sequences with intermissions between them, but preferably parts of a continuos move.

During the dip into the liquid a thin layer 34 (FIG. 3) of it will adhere to the tapered end surface 33 of the fiber up to a predetermined distance from the face end 26 depending on the preset value of the second moving sequence. Normally, said distance should be 0.20-0.30 mm, leaving a part of the tapered end uncoated. As mentioned before said coating is basically a lacquer that is hardened after the dip by means of ultraviolet radiation provided by the UV lamp 29 arranged near the container 16. After the hardening the fiber end is ready for the next step in its complete preparation for connection to a laser or light-receiving device.

It should be noted that the tapered fiber end according to the shown embodiment is only one example of fiber ends that can be coated or masked according to the present invention. There are many other forms of fibers and fiber ends that are suitable for treatment in the same way.

The invention claimed is:

1. A method of applying a coating on an end of an optical fiber comprising dipping said end into an unsolidified coating liquid, comprising the steps of:
    moving in a first sequence, the fiber end towards the surface of the liquid;
    measuring the distance between the face of the fiber end and the surface of the liquid by visioning the fiber end face and a mirror projection of the fiber end face created by the surface of the liquid and measuring the distance between the fiber end face and the projection;
    comparing the actual distance value with a preset distance value;
    ending the first moving sequence of the fiber end when the actual distance value is equal to the preset value;
    moving, in a second sequence, the fiber end to a predetermined depth in the liquid; and
    moving in a third sequence, the fiber end up from the liquid.

2. The method according to claim 1, wherein the visioning, measuring and comparing steps includes steps of automated image and data processing.

3. The method according to claim 2, wherein the moving steps are performed in the vertical direction.

4. The method according to claim 3, wherein the visioning is performed by a camera arranged at an angle of 25-35 degrees to the liquid surface.

5. The method according to claim 4 wherein the preset value is chosen to be a value between 0.10-0.20 mm from the surface of the liquid.

* * * * *